United States Patent
Sumino et al.

(10) Patent No.: US 7,192,765 B2
(45) Date of Patent: *Mar. 20, 2007

(54) METHOD FOR PRODUCING A NITRIFICATION CARRIER AND FOR REMOVING NITROGEN

(75) Inventors: Tatsuo Sumino, Chiyoda-ku (JP); Kazuichi Isaka, Chiyoda-ku (JP)

(73) Assignee: Hitachi Plant Engineering & Construction Co., Ltd., Tokyo (JP)

(*) Notice: Subject to any disclaimer, the term of this patent is extended or adjusted under 35 U.S.C. 154(b) by 518 days.

This patent is subject to a terminal disclaimer.

(21) Appl. No.: 10/347,706

(22) Filed: Jan. 22, 2003

(65) Prior Publication Data

US 2003/0143718 A1    Jul. 31, 2003

(30) Foreign Application Priority Data

Jan. 25, 2002  (JP) ............................. 2002-016344

(51) Int. Cl.
*C02F 3/02* (2006.01)
*B09B 3/00* (2006.01)
*C12N 11/08* (2006.01)
*C12N 11/04* (2006.01)
*C12M 1/00* (2006.01)

(52) U.S. Cl. .................. 435/262.5; 210/601; 435/180; 435/182; 435/395; 435/289.1; 435/800

(58) Field of Classification Search .............. None
See application file for complete search history.

(56) References Cited

U.S. PATENT DOCUMENTS

| | | | |
|---|---|---|---|
| 4,634,672 A | 1/1987 | Baumgarten et al. | |
| 4,791,061 A * | 12/1988 | Sumino et al. | 435/178 |
| 5,849,180 A | 12/1998 | Sumino et al. | |
| 5,876,603 A | 3/1999 | Sumino et al. | |
| 5,997,736 A | 12/1999 | Sumino et al. | |
| 6,033,569 A | 3/2000 | Sumino et al. | |
| 6,103,191 A * | 8/2000 | Luker | 422/38 |
| 6,569,334 B1 * | 5/2003 | Yoneda | 210/610 |
| 6,673,247 B2 * | 1/2004 | Olson | 210/710 |
| 6,916,651 B2 * | 7/2005 | Sumino | 435/262.5 |

FOREIGN PATENT DOCUMENTS

| | | |
|---|---|---|
| EP | 0 845 480 A1 | 6/1998 |
| JP | 55-145593 | 11/1980 |
| JP | 56-127109 | 10/1981 |
| JP | A 61-204089 | 9/1986 |
| JP | 62-027099 | 2/1987 |
| JP | 62-143687 | 6/1987 |
| JP | B2 64-9072 | 2/1989 |
| JP | 09-075984 | 3/1997 |
| JP | 11-046754 | 2/1999 |
| JP | 11-123076 | 5/1999 |

OTHER PUBLICATIONS

Hiroaki Uemoto et al, "Distribution of Nitrosomonas europaea and Paracoccus denitrificans immobilized in tubular polymeric gel for nitrogen removal", Applied and Environmental Microbiology, vol. 66, No. 2, Feb. 2000, pp. 816-819.

Minoru Tada et al., "Nitrogen Removal Systems Using Immobilized Microorganisms in Synthetic Resin", Hitachi Review., vol. 39, No. 6, Dec. 1990, pp. 379-386.

Uchida et al., "Fundamental Investigation of Entrapment and Immobilization Methods for Waste Treatment, Proceedings of the 42$^{nd}$ Annual Conference of the Japan Society of Civil Engineers", 2, 1987, pp. 832-833.

* cited by examiner

*Primary Examiner*—David M. Naff
(74) *Attorney, Agent, or Firm*—Oliff & Berridge, PLC

(57) ABSTRACT

Provided are a nitrite-type nitrification carrier and a method for producing the same and a method and an apparatus for removing nitrogen using the same, in which the quantity of organic matter to be added can be substantially reduced to reduce running cost. A method for producing a nitrite-type nitrification carrier in which ammonia-oxidizing bacteria for nitrifying ammonium to nitrite is preferentially accumulated comprises the steps of: entrapping and immobilizing any sludge selected from sediment from a lake, a river or the sea, soil from the surface of the earth, or activated sludge from a sewage-treatment plant into a monomer or a prepolymer for immobilizing microorganisms; and then subjecting the entrapped and immobilized sludge to heat treatment at 30 to 80° C.

12 Claims, 3 Drawing Sheets

METHOD FOR PRODUCING A NITRIFICATION CARRIER AND FOR REMOVING NITROGEN

BACKGROUND OF THE INVENTION

1. Field of the Invention

The present invention relates to a nitrite-type nitrification carrier and a method for producing the same and a method and an apparatus for removing nitrogen using the same, and relates to a technology for removing ammonium in water and in the atmosphere by a nitrite-type nitrification reaction.

2. Description of the Related Art

Biological treatment of wastewater and sewage with microorganisms has been widely used because of its relatively low cost. However, some type of microorganisms have slow growth rate, are easily poisoned, or are difficult to multiply in some environment, so that the biological treatment is sometimes not an effective method. Therefore, a treatment method has become commercially practical in which the biological treatment is carried out by using an immobilized microorganism carrier in which a specific microorganism is previously entrapped and immobilized in order to positively form the environment where the microorganism is easily propagated.

Gel materials are typically used for the immobilizing material for supporting (holding) microorganisms inside them. The requirement for these materials includes being harmless to natural environment, no change of properties or not being decomposed by microorganisms, having high mechanical strengths, being capable of supporting microorganisms in sufficient abundance and the like. The gel materials which have become commercially practical include a polyethyleneglycol-based polymer described in Japanese Pat. No. 1,630,654, a polyvinyl alcohol-based resin and the like. As for the microorganisms to be entrapped and immobilized in the gel material, nitrifying bacteria that oxidize ammonium are mainly used, and the sources of the microorganisms are the activated sludge from a sewage-treatment plant or microorganisms which are grown axenically.

When ammonium in wastewater is to be removed using a conventional immobilized microorganism carrier in which the nitrifying bacteria are entrapped and immobilized, ammonium is oxidized to nitrate, which is a final oxidized product, through nitrite in aerobic conditions. This nitrate is converted to nitrogen gas and water by denitrifying bacteria in anaerobic conditions to remove nitrogen.

However, the conversion from nitrate to nitrogen gas using the denitrifying bacteria needs the addition of organic matter such as methanol, which has the drawback of increasing running cost. Therefore, a method for removing nitrogen that requires the addition of only a small amount of organic matter has been desired.

As a method for removing nitrogen which solves this drawback, the SHARON-ANAMMOX reaction process has been developed in which the oxidation of ammonium is stopped midway so that about halves of nitrite and ammonia, respectively, remain after the denitrification. However, it is extremely difficult to control the reaction so as to allow about halves of nitrite and ammonia, respectively, to remain, and the process has hence the drawback of easily resulting in a large amount of nitrate, which is the final oxidized product.

Thus, the present state of the art is that either of the conventional immobilized microorganism carrier and the SHARON-ANAMMOX reaction process have not yet solved the problem of decreasing the quantity of the organic additive to reduce the running cost.

SUMMARY OF THE INVENTION

The present invention has been developed in view of the above-described circumstance, and it is an object of the present invention to provide a nitrite-type nitrification carrier and a method for producing the same and a method and an apparatus for removing nitrogen using the same, in which the quantity of the organic matter to be added can be substantially reduced to reduce running cost.

To attain the above-described object, the present invention is directed to a method for producing a nitrite-type nitrification carrier in which ammonia-oxidizing bacteria for nitrifying ammonic nitrogen to nitrous nitrogen are preferentially accumulated, the method comprising the steps of: entrapping and immobilizing any sludge selected from sediment from a lake, sediment from a river, sediment from a sea, soil from a surface of the earth, activated sludge from a sewage-treatment plant, into one of monomer and prepolymer for immobilizing microorganisms; and then subjecting the entrapped and immobilized sludge to heat treatment at a temperature of 30 to 80° C.

The present invention is also directed to a method for producing a nitrite-type nitrification carrier in which ammonia-oxidizing bacteria for nitrifying ammonic nitrogen to nitrous nitrogen are preferentially accumulated, the method comprising the steps of: polymerizing one of monomer and prepolymer for immobilizing microorganisms, while performing heat treatment at a temperature of 30 to 80° C. in presence of any sludge selected from sediment from a lake, sediment from a river, sediment from a sea, soil from a surface of the earth, activated sludge from a sewage-treatment plant.

The present invention have been developed according to the finding that the nitrite-type nitrification carrier in which ammonia-oxidizing bacteria that nitrify ammonium to nitrite are preferentially accumulated can easily be produced by entrapping and immobilizing complex microorganism sludge into a monomer or a prepolymer and then subjecting the entrapped and immobilized sludge to heat treatment at a temperature of 30 to 80° C., or by performing heat treatment at a temperature of 30 to 80° C. when polymerizing the monomer or the prepolymer to entrap and immobilize the complex microorganism sludge in the presence of this sludge, using the complex microorganism sludge in which a large number of microorganisms are mixed, such as sediment from a lake, a river or the sea, soil from the surface of the earth, or activated sludge from a sewage-treatment plant, as source of the microorganisms.

In other words, in accordance with the present invention, the complex microorganism sludge is not subjected to the heat treatment at 30 to 80° C. in a naked state, but is subjected to the heat treatment at 30 to 80° C. in a state that the complex microorganism sludge is entrapped in a monomer or a prepolymer, or is subjected to the heat treatment at 30 to 80° C. during polymerization in a gelation reaction in which the complex microorganism sludge is to be entrapped in the monomer or the prepolymer. Thus, the ammonia-oxidizing bacteria for performing the nitrite-type nitrification can preferentially be accumulated from the complex microorganism sludge in which a plurality of microorganisms are mixed, and the accumulation of nitrite-oxidizing bacteria that oxidize nitrite to nitrate can be suppressed. The heat treatment is more preferably performed at a temperature of 40 to 70° C., thereby capable of performing a nitrite-type nitrification reaction up to approximately 100%.

Preferably, the heat-treatment time for producing the nitrite-type nitrification carrier is one hour or longer, because the heating of one hour or longer is preferred for preferentially accumulating ammonia-oxidizing bacteria and suppressing the accumulation of nitrite-oxidizing bacteria. Further, the heating of one day or longer can extremely stabilize the nitrite-type nitrification reaction. However, the heating of two weeks or longer will not change the effectiveness.

The present invention is also directed to the nitrite-type nitrification carrier produced by the above-described production method.

Preferably, the nitrite-type nitrification carrier is repeatedly subjected to reheat treatment once per three to twelve months after production, thereby recovering the reduced capability for oxidizing ammonium to nitrite and storing the nitrite.

The present invention is also directed to a method for removing nitrogen, comprising the step of bringing the above-described nitrite-type nitrification carrier into contact with at least one of water and atmosphere containing ammonic nitrogen under aerobic conditions. Thus, nitrate remaining in the nitrification-treated water can be substantially reduced as well as total nitrogen content remaining in the nitrification-treated water is reduced, thereby capable of reducing the quantity of the organic matter to be added to reduce running cost.

The present invention is also directed to a nitrogen removing apparatus, comprising: a nitrification tank for bringing the above-described nitrite-type nitrification carrier into contact with water containing ammonic nitrogen under aerobic conditions; and a heat-treatment tank for subjecting the nitrite-type nitrification carrier taken from the nitrification tank to heat treatment.

Preferably, the nitrogen removing apparatus further comprises a denitrification tank arranged in a downstream side of the nitrification tank, thereby eliminating nitrate remaining in the nitrified water.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 2 shows a graphical representation of a study on the relation between the heat-treatment temperature and the nitrite-type nitrification reaction when producing the nitrite-type nitrification carrier according to the present invention using lake sediment and the like.

DETAILED DESCRIPTION OF THE PREFERRED EMBODIMENTS

Figure 1:
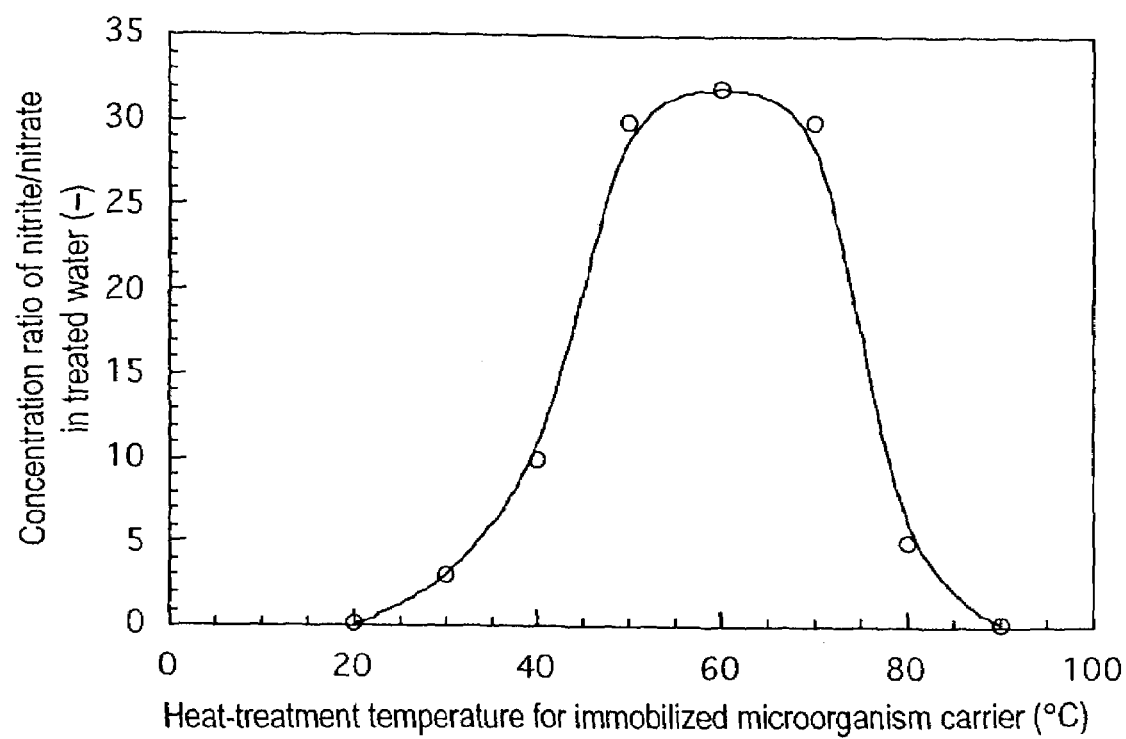
FIG. 1 shows a graphical representation of a study on the relation between the heat-treatment temperature and the nitrite-type nitrification reaction when producing the nitrite-type nitrification carrier according to the present invention using activated sludge.

The preferred embodiments of a nitrite-type nitrification carrier and a method for producing the same and a method and an apparatus for removing nitrogen using the same according to the present invention will now be described with reference to the appended drawings.

The nitrite-type nitrification carrier according to the present invention is produced by entrapping and immobilizing complex microorganism sludge into a monomer or a prepolymer and then subjecting the entrapped and immobilized sludge to heat treatment at 30 to 80° C., or by performing heat treatment at 30 to 80° C. when polymerizing the monomer or the prepolymer to entrap and immobilize the complex microorganism sludge in the presence of this sludge, using the complex microorganism sludge in which a large number of microorganisms are mixed, such as sediment from a lake, a river or the sea, soil from the surface of the earth, or activated sludge from a sewage-treatment plant, as the sources for the microorganisms. The heat-treatment method after the entrapping and immobilization may be direct heating of the carrier or heating of the carrier in water or indirect heating of the carrier in an atmosphere of air, and the temperature of the carrier needs to be 30 to 80° C. when any of the above heating methods is adopted.

In other words, it is important that the complex microorganism sludge is not subjected to the heat treatment at 30 to 80° C. in a naked state, but is subjected to the heat treatment at 30 to 80° C. in a state that the complex microorganism sludge is entrapped in a monomer or a prepolymer, or is subjected to the heat treatment at 30 to 80° C. during polymerization in a gelation reaction in which the complex microorganism sludge is to be entrapped in the monomer or the prepolymer. Thus, among a plurality of microorganisms mixed in the complex microorganism sludge, it is possible to preferentially accumulate the ammonia-oxidizing bacteria that nitrify ammonium to nitrite and to suppress the accumulation of nitrite-oxidizing bacteria that oxidize nitrite to nitrate. In this case, if the complex microorganism sludge is subjected to the heat treatment at 30 to 80° C. in a naked state, the microorganisms in the complex microorganism sludge would easily be solubilized, and it would be difficult to form an inhabiting space for the microorganisms after immobilization. On the other hand, by subjecting to the heat treatment after entrapping and immobilizing the microorganisms in an immobilizing material, the inhabiting space for the microorganisms is easily formed.

The immobilizing material for use in the production of the nitrite-type nitrification carrier according to the present invention includes monomethacrylates, monoacrylates, dimethacrylates, diacrylates, trimethacrylates, triacrylates, tetraacrylates, urethane acrylates, epoxy acrylates; in addition, polyvinyl alcohol, acryl amide, photo-curable polyvinyl alcohol, photo-curable polyethyleneglycol, photo-curable polyethylene glycol-polypropylene glycol prepolymer and the like.

FIG. 1 shows a study on the relation between the heat-treatment temperature and the nitrite-type nitrification reaction when producing the nitrite-type nitrification carrier according to the present invention using activated sludge from a sewage-treatment plant.

The test method was as follows: Eight samples of the nitrite-type nitrification carrier were produced by performing heat treatment for two hours at 20° C., 30° C., 40° C., 50° C., 60° C., 70° C., 80° C. and 90° C., respectively, when polymerizing a monomer or a prepolymer to entrap and immobilize the activated sludge in the presence of this sludge. Then, the respective nitrite-type nitrification carriers were brought into contact with synthetic wastewater having an ammonic nitrogen ($NH_4$—N) concentration of 40 mg/L in aerobic conditions, and the concentration ratio of the nitrite concentration to the nitrate concentration in the treated water was studied after a reaction time of three hours.

As apparent from FIG. 1, the concentration ratio was approximately zero at a heat-treatment temperature of 20° C., which means no nitrite presents in the treated water, that is, the nitrite-type nitrification carrier was not produced. By gradually raising the heat-treatment temperature, the concentration ratio became approximately 2.5 at 30° C., which means 2.5 times of nitrite to nitrate was produced in the treated water. This corresponds to a nitrite-type conversion rate defined in the following formula (1) of about 70%.

$$\text{nitrite-type conversion rate} = \{\text{nitrite}/(\text{nitrite}+\text{nitrate})\} \times 100 \quad (1)$$

By further raising the heat-treatment temperature, the concentration ratio became approximately 10 (the nitrite conversion rate of 91%) at 40° C., and the concentration ratio became the maximum of approximately 30 (the nitrite conversion rate of 97%) at a temperature of 50° C. to 70° C., which means that nearly 100% was the nitrite-type nitrification reaction. When the heat-treatment temperature exceeded 70° C., nitrate production increased to gradually reduce the concentration ratio to approximately 5 at 80° C. and zero at 90° C. The reason that the concentration ratio decreased at the heat-treatment temperature exceeding 70° C. is considered to be the reduction of the activity of ammonia oxidizing bacteria that perform nitrite-type nitrification at a heating temperature of higher than 70° C.

Figure 2:
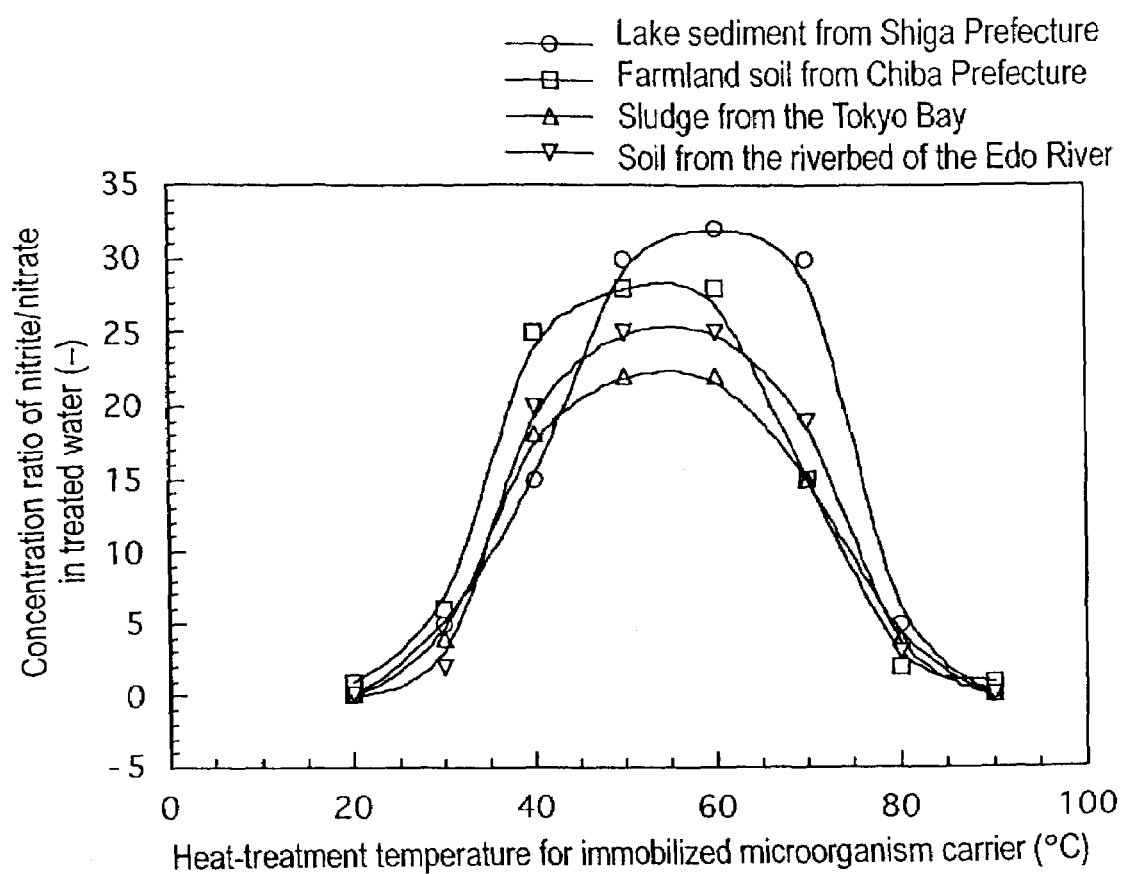

FIG. 2 shows a study on the relation between the heat-treatment temperature and the nitrite-type nitrification reaction when producing the nitrite-type nitrification carriers according to the present invention using various types of complex microorganism sludge. The test method was similar to FIG. 1, and was performed to four types of the complex microorganism sludge, that is, the lake sediment from Shiga Prefecture, the farmland soil from Chiba Prefecture, the sludge from the Bay of Tokyo, and the soil from the riverbed of the River of Edo. Note that seawater was used for the evaluation of the sludge from the Bay of Tokyo.

Although the concentration ratio of the treated water or the heat-treatment temperature where the concentration ratio becomes maximum varied a little depending on the types of the complex microorganism sludge, the concentration ratio was maximum in the range of 40 to 70° C. and dropped to 5 or below at 80° C. Among the four types of the complex microorganism sludge, particularly the sediment from Shiga Prefecture showed good results in which the maximum concentration ratio exceeded 30 similar to the activated sludge in FIG. 1.

The above-described results of FIGS. 1 and 2 mean that the preferred heat-treatment temperature for producing the nitrite-type nitrification carrier is in the range of 30 to 80° C. To achieve the nitrite-type nitrification reaction rate of nearly 100%, the heat treatment with a temperature in the range of 40 to 70° C. is required considering some differences depending on the types of the complex microorganism sludge.

The heat treatment was performed during polymerization in the studies shown in FIGS. 1 and 2, and similar results were obtained when the heat treatment was performed after entrapping and immobilization.

Table 1 shows a study of the relation between the heat-treatment time and the nitrite-type nitrification reaction when the nitrite-type nitrification carrier according to the present invention is produced using the activated sludge from a sewage-treatment plant.

The test method was as follows: the activated sludge taken from the sewage-treatment plant was entrapped and immobilized with a polyethylene glycol prepolymer, formed into a large number of cubed pellets with an edge of 3 mm, which was a non-heated carrier. Then, 200 mL of the non-heated carrier and 300 mL of tap water were added into an Erlenmeyer flask of 1 L, and the mixture was subjected to heat treatment at 60° C. for 30 minutes to obtain Sample 1, for one hour to obtain Sample 2, for one day to obtain Sample 3 and for two weeks to obtain Sample 4, respectively.

From each of the non-heated carrier and the heated carriers of Samples 1 to 4 which were produced, each 200 mL was taken and charged into their respective reaction tanks of 2 L provided side by side. Using these carriers, the wastewater containing ammonium was continuously treated for three months in aerobic conditions, and the ammonic nitrogen ($NH_4$—N) concentration, the nitrous nitrogen ($NO_2$—N) concentration and the nitric nitrogen ($NO_3$—N) concentration in the treated water were studied. The ammonic nitrogen ($NH_4$—N) concentration in the raw wastewater in each of the reactors was the same in the range of 36 to 46 mg/L. The flow rate of the wastewater for flowing into the reaction tanks was 11 mL/minute and the residence time in the reaction tanks was three hours.

TABLE 1

|  | $NH_4$—N (mg/L) | $NO_2$—N (mg/L) | $NO_3$—N (mg/L) |
| --- | --- | --- | --- |
| Raw wastewater | 36–46 | 0 | 0 |
| Treated water by non-heated carrier | 1 or less | 1 or less | 36–46 |
| Sample 1 (heated for 30 minutes) | 5–7 | 7–15 | 10–25 |
| Sample 2 (heated for one hour) | 3–6 | 10–20 | 2–6 |
| Sample 3 (heated for one day) | 3–5 | 12–24 | 1–2 |
| Sample 4 (heated for one week) | 3–5 | 12–24 | 1–2 |
| Sample 5 (heated for two weeks) | 3–5 | 12–22 | 1–2 |

As apparent from the results in Table 1, in the case of the non-heated carrier, the concentrations of nitric nitrogen ($NO_3$—N) and nitrous nitrogen ($NO_2$—N) in the treated water after the nitrification treatment were 36 to 46 mg/L and 1 mg/L or less, respectively, which means all of ammonium in the raw wastewater was oxidized to nitrate and no nitrite-type nitration reaction occurred.

For the Sample 1 in which the heat-treatment time was 30 minutes, some nitrite-type nitrification reaction occurred, but the production of the nitrite-type nitrification carrier was not complete since nitric nitrogen ($NO_3$—N) concentration in the treated water after the nitrification treatment was 10 to 25 mg/L.

For the Sample 2 in which the heat-treatment time was one hour, nitric nitrogen ($NO_3$—N) concentration in the treated water after the nitrification treatment was 2 to 6 mg/L, which indicates that the nitrite-type nitrification reaction has occurred considerably. Further, for the Samples 3 to 5 in which the heat-treatment time was one day or longer, nitric nitrogen ($NO_3$—N) concentration was 1 to 2 mg/L and nitrous nitrogen ($NO_2$—N) concentration was 10 to 24 mg/L in the treated water after the nitrification treatment, which means that the nitrite-type nitrification carrier was produced that performs the nitrite-type nitrification reaction in approximately 100%.

In addition, the sum of the total nitrogen content {($NH_4$—N)+($NO_2$—N)+($NO_3$—N)} for each of the Samples 1 to 5, especially the sum of the total nitrogen content for each of the Samples 2 to 5 is smaller than that for the non-heated carrier. This is considered to be due to the occurrence of aerobic denitrification in which nitrite was directly converted to nitrogen gas by a nitrite-type nitrification reaction.

The results of Table 1 mean that the preferred heat-treatment time for producing the nitrite-type nitrification carrier is one hour or longer. More preferably, the nitrite-type nitrification reaction was stably performed by the heat treatment for one day to one week. Note that the heat treatment for two weeks or longer is considered to be useless even in consideration of the difference of the types of the complex microorganism sludge or the difference of individual pieces of the nitrite-type nitrification carriers.

The heat treatment was performed after entrapping and immobilization in the studies shown in Table 1, and similar results were obtained when the heat treatment was performed during polymerization.

Figure 3:
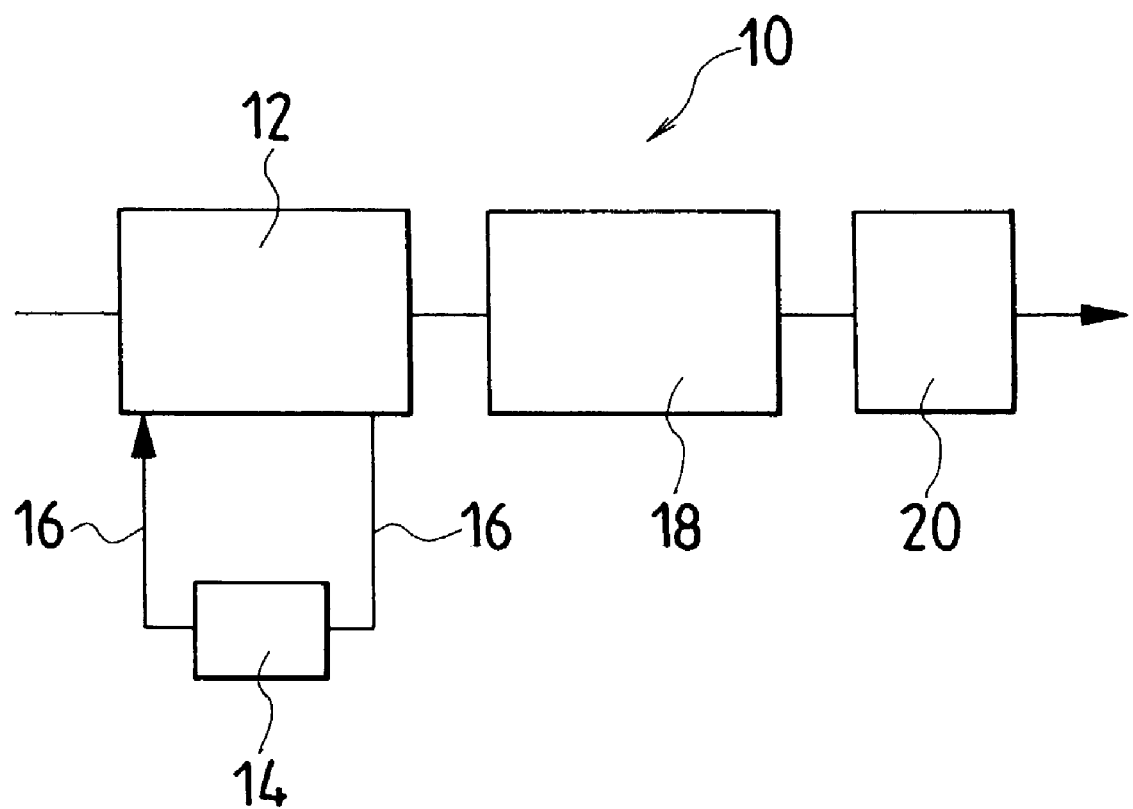
FIG. 3 is a block diagram of a nitrogen removing apparatus according to the present invention.

FIG. 3 shows the arrangement of a nitrogen removing apparatus 10 according to the present invention comprising a nitrification tank 12 for bringing the nitrite-type nitrification carrier of the present invention into contact with wastewater in aerobic conditions; a heat-treatment tank 14 for subjecting a part or all of the nitrite-type nitrification carrier to heat treatment at 30 to 80° C. by circulating through a circulation channel 16 provided between the heat-treatment tank 14 and the nitrification tank 12; a denitrification tank 18 provided in the downstream side of the nitrification tank 12; and a reaeration tank 20. The performance for removing nitrogen of the nitrite-type nitrification carrier of the present invention was studied with the nitrogen removing apparatus 10. The nitrite-type nitrification carrier, which has been subjected to heat treatment for two hours at 70° C. during the polymerization for producing the carrier, was used for the study. Further, the raw wastewater discharged from a chemical plant was used, and the nitrogen components of the raw wastewater are shown in Table 2.

The test conditions were as follows: the residence time in the nitrification tank was six hours, the residence time in the denitrification tank was six hours, the residence time in the reaeration tank was two hours, and methanol was added into the denitrification tank as organic matter. For the heat-treatment cycle in the heat-treatment tank, one percent of the nitrite-type nitrification carrier per day was taken from the nitrification tank, subjected to reheat treatment at 60° C. for four hours and returned to the nitrification tank. Thus, all of the nitrite-type nitrification carriers were subjected to the reheat treatment in 100 days, and the treatment operation was continued for one year.

In the conventional method as a comparative example, the heat-treatment tank in FIG. 3 was not used in the nitrogen removing apparatus, and a conventional immobilized microorganism carrier (shown as a non-heated carrier in Table 1) was used for the carrier. Note that the complex microorganism sludge entrapped and immobilized into the non-heated carrier is the same as that used for the nitrogen removing apparatus according to the present invention.

The treated water through the present invention in Table 2 is that treated by the nitrogen removing apparatus according to the present invention, and the treated water through the conventional method is that treated by the conventional nitrogen removing apparatus.

TABLE 2

|  | Raw water | Treated water through the present invention | Treated water through the conventional method |
|---|---|---|---|
| $NH_4$—N (mg/L) | 60–84 | 1 or less | 1 or less |
| $NO_2$—N (mg/L) | 1 or less | 1 or less | 1 or less |
| $NO_3$—N (mg/L) | 3–10 | 2–4 | 4–8 |
| Total nitrogen concentration (mg/L) | 63–94 | 2–5 | 5–10 |
| BOD concentration (mg/L) | 10–20 | 10 or less | 10 or less |
| Relative ratio of quantities of methanol to be added |  | 1 | 2 |

As apparent from the results in Table 2, use of the nitrite-type nitrification carrier according to the present invention causes aerobic denitrification in the nitrification tank and a nitrite-type nitrification reaction to occur, thereby reducing the quantity of methanol to be added in the denitrification tank to half of that for the nitrogen removing apparatus using the conventional non-heated carrier. Furthermore, the nitrogen removing apparatus according to the present invention was able to reduce the total nitrogen concentration compared with the conventional method.

In addition, it has been apparent from the field test for the plant wastewater that, in the nitrite-type nitrification carrier according to the present invention, the capability for stopping the reaction of ammonium at the point of nitrite may be a little different depending on the manner how the carrier is used, but is gradually reduced after a lapse of three to twelve months from the production, so that the nitrite-type nitrification carrier is preferably subjected to the reheat treatment at 30 to 80° C. every three to twelve months after the production of the nitrite-type nitrification carrier.

As described above, the nitrite-type nitrification carrier and the method for producing the same, and the method and the apparatus for removing nitrogen using the same according to the present invention provide the nitrite-type nitrification carrier capable of performing the nitrification reaction in which the nitrite-type nitrification reaction is nearly 100%, thereby substantially reducing the quantity of organic matter to be added to reduce running cost.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A method for producing a nitrification carrier in which ammonia-oxidizing bacteria for nitrifying ammonic nitrogen to nitrous nitrogen are preferentially accumulated, the method comprising the steps of:
   entrapping and immobilizing sludge selected from the group consisting of sediment from a lake, sediment from a river, sediment from a sea, soil from a surface of the earth, and activated sludge from a sewage-treatment plant, by polymerizing a monomer or a prepolymer in presence of the sludge; and
   then subjecting the entrapped and immobilized sludge to heat treatment at a temperature of 30 to 80° C.

2. The nitrification carrier produced by the method according to claim 1.

3. A method for removing nitrogen, comprising the step of bringing the nitrification carrier according to claim 2 into contact with at least one of water and atmosphere containing ammonic nitrogen under aerobic conditions.

4. The method according to claim 1, wherein length of time of the heat treatment is at least one hour.

5. The nitrification carrier produced by the method according to claim 4.

6. A method for removing nitrogen, comprising the step of bringing the nitrification carrier according to claim 5 into contact with at least one of water and atmosphere containing ammonic nitrogen under aerobic conditions.

7. The method according to claim 1, further comprising repeatedly subjecting the nitrification carrier to reheat treatment at a temperature of 30 to 80° C. once per three to twelve months after production to maintain performance of the carrier.

8. The nitrification carrier produced by the method according to claim 7.

9. A method for removing nitrogen, comprising the step of bringing the nitrification carrier according to claim 8 into contact with at least one of water and atmosphere containing ammonic nitrogen under aerobic conditions.

10. The method according to claim 4, further comprising repeatedly subjecting the nitrification carrier to reheat treatment at a temperature of 30 to 80° C. once per three to twelve months after production to maintain performance of the carrier.

11. The nitrification carrier produced by the method according to claim 10.

12. A method for removing nitrogen, comprising the step of bringing the nitrification carrier according to claim 11 into contact with at least one of water and atmosphere containing ammonic nitrogen under aerobic conditions.

* * * * *